(12) United States Patent
Glezer et al.

(10) Patent No.: US 10,670,341 B2
(45) Date of Patent: Jun. 2, 2020

(54) ULTRA-COMPACT, SCALABLE, DIRECT-CONTACT VAPOR CONDENSERS USING ACOUSTIC ACTUATION

(71) Applicant: GEORGIA TECH RESEARCH CORPORATION, Atlanta, GA (US)

(72) Inventors: Ari Glezer, Atlanta, GA (US); Thomas Boziuk, Atlanta, GA (US); Marc Smith, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 412 days.

(21) Appl. No.: 15/334,938

(22) Filed: Oct. 26, 2016

(65) Prior Publication Data

US 2017/0115064 A1    Apr. 27, 2017

Related U.S. Application Data

(60) Provisional application No. 62/246,274, filed on Oct. 26, 2015.

(51) Int. Cl.
| | |
|---|---|
| *F28B 3/06* | (2006.01) |
| *B01D 19/00* | (2006.01) |
| *B01D 5/00* | (2006.01) |
| *F28F 13/10* | (2006.01) |
| *B06B 3/00* | (2006.01) |
| *F28B 9/00* | (2006.01) |

(52) U.S. Cl.
CPC .............. *F28B 3/06* (2013.01); *B01D 5/0027* (2013.01); *B01D 5/0045* (2013.01); *B01D 19/0078* (2013.01); *B06B 3/00* (2013.01); *F28B 9/00* (2013.01); *F28F 13/10* (2013.01)

(58) Field of Classification Search
CPC ...... F28B 3/06; F28B 9/00; B06B 3/00; F28F 13/01; B01D 5/0027; B01D 9/0078; B01D 5/0045; B01D 5/003; F25B 39/04
USPC .......................................................... 62/121
See application file for complete search history.

(56) References Cited

U.S. PATENT DOCUMENTS

| | | | | |
|---|---|---|---|---|
| 4,070,167 A * | 1/1978 | Barbee | ............... | B01D 19/0078 118/602 |
| 5,523,058 A * | 6/1996 | Umemura | ................ | A61N 7/02 134/1 |
| 6,620,226 B2 * | 9/2003 | Hutton | ............... | B01D 19/0078 95/30 |
| 2005/0016380 A1 * | 1/2005 | Matsuura | ................ | B01D 3/06 96/389 |
| 2015/0291454 A1 * | 10/2015 | McGuire | .................. | C02F 1/36 210/209 |

* cited by examiner

*Primary Examiner* — Steve S Tanenbaum
(74) *Attorney, Agent, or Firm* — Troutman Sanders LLP; Ryan A. Schneider

(57) ABSTRACT

The disclosed technology includes techniques for improving efficiency of heat transfer devices, specifically condensers. An exemplary embodiment provides a device for condensing vapor bubbles comprising a quantity of liquid, a vapor source, and an acoustic transducer. The vapor source can be configured to introduce a plurality of vapor bubbles in the quantity of liquid. The acoustic transducer can be configured to provide acoustic energy to the quantity of liquid such that at least a portion of the acoustic energy is transferred to the plurality of vapor bubbles causing at least a portion of the plurality of vapor bubbles to condense in the quantity of liquid.

21 Claims, 5 Drawing Sheets

ULTRA-COMPACT, SCALABLE, DIRECT-CONTACT VAPOR CONDENSERS USING ACOUSTIC ACTUATION

CROSS-REFERENCE TO RELATED APPLICATIONS

This application claims priority to, and the benefit under 35 U.S.C. §119(e), of U.S. Provisional Patent Application No. 62/246,274, filed 26 Oct. 2015, the entire contents and substance of which are hereby incorporated by reference as if fully set forth below.

TECHNICAL FIELD OF THE INVENTION

The various embodiments of the present disclosure relate generally to condensers. More particularly, the various embodiments of the present invention are directed to vapor condensers using acoustic actuation.

BACKGROUND OF THE INVENTION

Several processes rely on condensation, including many industrial applications, which rely on or involve condensation-based or condensation-related processes. For instance, many power plants rely on industrial direct-contact condensing, wherein sub-cooled liquid is intimately mixed with vapor exiting a turbine. Condensation of the steam requires a substantial volume of water to provide enough contact time between the vapor and the sub-cooled liquid for the vapor to condense. The requisite volume of sub-cooled liquid requires the overall heat transfer device to occupy a significant amount of space and applies backpressure to the turbine, decreasing the efficiency of the turbine. In currently available condensers, reducing the amount of sub-cooled liquid to reduce the amount of backpressure at the turbine, also decreases the efficiency of the condensing process. Decreases in the efficiency of either the turbine or the condensing process negatively affect the efficiency of the thermodynamic cycle, and thus the profitability of the power plant.

To maximize the thermodynamic efficiency, and the corresponding profitability, of a power plant, solutions should be designed to condense vapor at the lowest possible pressure. Further, solutions should be designed to condense vapor while minimizing the size of the condenser. Solutions should also be designed that are applicable to other condensation processes in which vapor comes into contact with a sub-cooled liquid, including, but not limited to: large-scale, phase-change cooling solutions for server farms and smaller-scale heat dissipation applications such as cooling compact, high-powered electronics (e.g., overclocked processors for computer image rendering, power conversion electronics used for electric drivetrains or energy generation). Various embodiments of the present invention address one or more of these desires.

BRIEF SUMMARY OF THE INVENTION

The present invention relates to systems and methods for condensing vapor with the application of acoustic energy. An exemplary embodiment of the present invention provides a device for condensing vapor bubbles. The device can comprise a quantity of liquid, a vapor source, and an acoustic transducer. The vapor source can be configured to introduce a plurality of vapor bubbles into the quantity of liquid. The acoustic transducer can be configured to provide acoustic energy to the quantity of liquid such that at least a portion of the acoustic energy is transferred to the plurality of vapor bubbles causing at least a portion of the plurality of vapor bubbles to condense in the quantity of liquid.

In some embodiments of the present invention, the acoustic transducer can be configured to produce acoustic energy only when at least one of the plurality of bubbles is introduced in the quantity of liquid.

In some embodiments of the present invention, the acoustic transducer can create an acoustic beam directed at the plurality of vapor bubbles.

In some embodiments of the present invention, the acoustic transducer can be configured to provide acoustic energy at an ultrasonic frequency.

In some embodiments of the present invention, the plurality of bubbles can generally travel in a first direction in the quantity of liquid and the acoustic beam can be directed in a second direction, wherein the second direction can be opposite the first direction.

In some embodiments of the present invention, the plurality of bubbles can generally travel in a first direction in the quantity of liquid and the acoustic beam can be directed in a second direction, wherein the second direction can be generally perpendicular to the first direction.

In some embodiments of the present invention, the acoustic transducer can be configured to provide acoustic energy at an audible frequency.

Another exemplary embodiment of the present invention provides a device for condensing vapor. The device comprises a quantity of liquid, a quantity of vapor, and an acoustic transducer. The quantity of vapor can contact the quantity of liquid, creating a liquid-vapor interface. The acoustic transducer can be configured to provide acoustic energy to the quantity of liquid such that at least a portion of the acoustic energy is transferred to the liquid-vapor interface causing at least a portion of the quantity of vapor to condense in the quantity of liquid.

In some embodiments of the present invention, the acoustic transducer can create an acoustic beam and the acoustic beam can be directed towards at least a portion of the liquid-vapor interface.

In some embodiments of the present invention, the acoustic transducer can provide acoustic energy at an ultrasonic frequency.

In some embodiments of the present invention, the acoustic transducer operates in a range of about 0.5 MHz to about 10 MHz.

In some embodiments of the present invention, the acoustic transducer provides acoustic energy at an audible frequency.

In some embodiments of the present invention, the acoustic transducer operates in a range of about 400 Hz to about 20 kHz.

Another exemplary embodiment of the present invention provides a method for condensing vapor. The method can comprise introducing vapor to a liquid to generate at least one liquid-vapor interface, and introducing acoustic energy to the liquid, such that at least a portion of the acoustic energy is transferred to the at least one liquid-vapor interface causing at least a portion of the vapor to condense.

In some embodiments of the present invention, the acoustic energy can have a frequency in the ultrasonic frequency range.

In some embodiments of the present invention, the acoustic energy can be introduced in the form of an acoustic beam.

In some embodiments of the present invention, the vapor can form a plurality of vapor bubbles in the liquid, the vapor bubbles can travel in a first direction in the liquid, and the acoustic beam can transmit acoustic energy in a direction opposite the first direction.

In some embodiments of the present invention, the vapor can form a plurality of vapor bubbles in the liquid, the vapor bubbles can travel in a first direction in the liquid, and the acoustic beam can transmit acoustic energy in a direction perpendicular to the first direction.

In some embodiments of the present invention, the acoustic energy can have a frequency in the audible frequency range.

In some embodiments of the present invention, introducing acoustic energy to the liquid can comprise introducing a first acoustic beam directed at a location of a first liquid-vapor interface, and introducing a second acoustic beam directed at a location of a second liquid-vapor interface.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE FIGURES

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

Figures 1A, 1B, 1C:
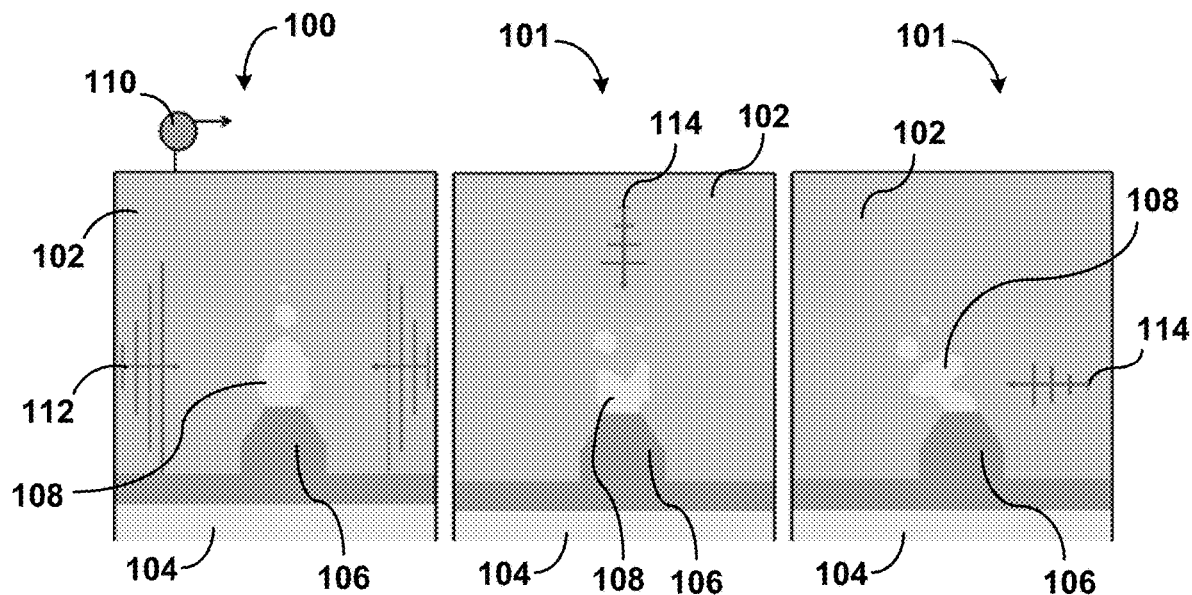
FIG. 1A depicts a low-frequency condensation device, in accordance with an exemplary embodiment of the present invention.
FIG. 1B depicts a high-frequency condensation device, in accordance with an exemplary embodiment of the present invention.
FIG. 1C depicts a high-frequency condensation device, in accordance with an exemplary embodiment of the present invention.

To facilitate an understanding of the principles and features of the present invention, various illustrative embodiments are explained below. The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

There is an ever-increasing need for electric energy, which drives a need for improvement in the efficiency of power plant systems. Power plants that rely on direct-contact condensation, for example, would benefit from an improved method of condensing vapor. Further, power plants, for example, would benefit from an ultra-compact, scalable method of condensing vapor.

Some embodiments of the disclosed technology include novel techniques for improving direct-contact vapor condensation using acoustic actuation. According to certain embodiments, these techniques can provide ultra-compact, scalable condensers. In some embodiments, these techniques are applied in a condensation process in which vapor comes into contact with a sub-cooled liquid and are not necessarily restricted to use in conventional condensers. In some embodiments, vapor may be introduced to a liquid to generate a liquid-vapor interface. According to certain embodiments, the condensation process may be co-located with a process that generates the vapor; in some embodiments, the condensation process may be located separately from a process that generates the vapor. In some embodiments, acoustic energy may be introduced to the liquid. In some embodiments, at least a portion of the acoustic energy may be transferred through the liquid to the liquid-vapor interface. Certain embodiments may function at a variety of ambient pressures; in some embodiments, the ambient pressure does not adversely affect the effectiveness of the condensation process. Accordingly, the acoustic energy may cause at least a portion of the vapor to condense.

This approach may improve the efficiency of the heat transfer process by creating surface capillary waves, causing disturbances at the liquid-vapor interface that may significantly increase the mixing on both the liquid side and the vapor side of the interface, which may lead to significant improvement of the condensation process. Furthermore, this approach, when applying acoustic energy at ultrasonic frequencies, may disturb the liquid-vapor interface on both a large scale (e.g., cause disturbances at a magnitude of mm) and a small scale (e.g., cause droplet ejection at a magnitude of μm to mm). Additionally, this approach may be used to mitigate or to avoid cavitation damage to a solid surface (for example, a propeller or a turbine blade used in a high-speed water system) by directing vapor bubbles away from the solid surface prior to the vapor bubbles' collapse. This approach may also be used to suppress or prevent the formation of cavitation bubbles. Moreover, this approach may require less space for a condenser itself, enabling compact condenser designs. Furthermore, this approach may reduce the amount of sub-cooling required of a condenser to complete phase-change, allowing the condenser to operate at a reduced saturation pressure. In addition, this approach may reduce vapor injection losses by increasing the liquid-vapor interfaces and thus reducing or obviating the need for injection of large numbers of small-diameter vapor bubbles, as is the current practice in some industrial applications. As a result, this approach may enable a reduction in the back-pressure on a turbine and may positively affect the overall efficiency of a power plant or any other application applying this approach.

Throughout this disclosure, certain embodiments are described in exemplary fashion in relation to large-scale condenser designs for use with a turbine. However, embodiments of the disclosed technology are not so limited and can be applied to many different fields. For example, in some embodiments, the disclosed technology may be effective in large scale, phase-change cooling solutions for server farms. Moreover, certain embodiments may be effective in smaller-scale heat dissipation applications such as cooling compact, high-powered electronics (e.g., overclocked processors for computer image rendering, power conversion electronics used for electric drivetrains or energy generation). Additionally, certain embodiments may be used to avoid cavitation damage to equipment, including, but not limited to, propellers and turbine blades.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Throughout the specification, the term "low-frequency" is used to describe frequencies in the audible frequency range, i.e., about 20 Hz to about 20 kHz, and the term "high-frequency" is used to describe frequencies in the ultrasonic frequency range, i.e., greater than about 20 kHz.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Various devices and methods are disclosed for improving direct-contact vapor condensation using acoustic actuation, some of which will now be described with reference to the accompanying figures.

FIG. 1A depicts a low-frequency (i.e., having a frequency in the audible frequency range) condensation device 100 for condensing vapor bubbles, according to an exemplary embodiment. The low-frequency condensation device 100 may include a liquid 102, a source of vapor 104 and a nozzle 106 for introducing the vapor 104 to the liquid 102, such that a plurality of vapor bubbles 108 forms in the liquid 102. The liquid 102 can be many different liquids known in the art, including, but not limited to, liquid water. The vapor 104 can be many different vapors known in the art, including, but not limited to, water vapor. The source of vapor 104 can be many different sources of vapor known in the art. For example, in some embodiments, the source of vapor 104 is the exhaust of a steam turbine. In some examples, the source of vapor 104 is the product of boiling at a surface.

A vacuum pump 110 may be provided to adjust the operating pressure of the low-frequency condensation device 100. One or more low-frequency transducers 112 may provide acoustic energy to the liquid 102 such that at least a portion of the energy is transferred to the plurality of vapor bubbles 108. The frequency of the low-frequency acoustic energy can be between about 20 Hz and about 20 kHz, in accordance with various embodiments of the present invention. In an exemplary embodiment of the present invention, the frequency of the low-frequency acoustic energy can be between about 700 Hz and about 2 kHz. This acoustic energy may then cause at least a portion of the vapor bubbles 108 to condense. FIG. 1A depicts the use of two low-frequency transducers 112, but it should be noted that any number of low-frequency transducers 112 is herein contemplated, including the use of one low-frequency transducer 112.

FIG. 1B depicts a high-frequency (i.e., having a frequency in the ultrasonic frequency range) condensation device 101 for condensing vapor bubbles, according to an exemplary embodiment. The high-frequency condensation device 101 may include a liquid 102, a source of vapor 104 and a nozzle 106 for introducing the vapor 104 to the liquid 102, such that a plurality of vapor bubbles 108 forms in the liquid 102. One or more high-frequency transducers 114 (i.e., transducers that generate acoustic energy having a frequency that is ultrasonic) may provide acoustic energy to the liquid 102 such that at least a portion of the energy is transferred to the plurality of vapor bubbles 108. The frequency of the high-frequency acoustic energy can be greater than about 20 kHz, in accordance with various embodiments of the present invention. In an exemplary embodiment of the present invention, the frequency of the low-frequency acoustic energy can be between about 0.5 MHz and about 10 MHz. This acoustic energy may then cause at least a portion of the vapor bubbles 108 to condense. FIG. 1B depicts a high-frequency transducer 114 configured to generate acoustic energy that travels in a direction opposite of the direction in which the vapor bubbles 108 travel, such that the acoustic energy encounters the vapor bubbles 108 head-on. According to an exemplary embodiment, FIG. 1C depicts a high-frequency transducer 114 configured to generate acoustic energy that travels in a direction perpendicular to the direction in which the vapor bubbles 108 travel. It should be noted that while FIG. 1B and FIG. 1C both depict the use of a single high-frequency transducer 114, the use any number of high-frequency transducers 114 is herein contemplated.

Figure 2:
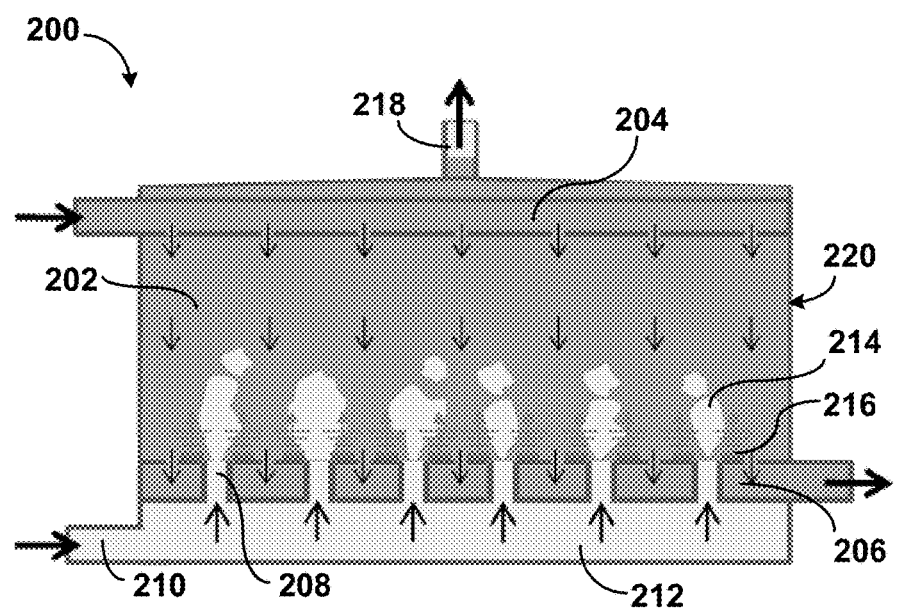
FIG. 2 depicts a countercurrent vapor condenser, in accordance with an exemplary embodiment of the present invention.

FIG. 2 depicts a countercurrent vapor condenser 200, in accordance with an exemplary embodiment of the present invention. The countercurrent vapor condenser 200 is designed to operate in countercurrent vapor/liquid flow. Liquid 202 may be injected through a spreading manifold 204 at the top of the countercurrent vapor condenser 200, and liquid may be removed through an outlet manifold 206. The outlet manifold 206 may further comprise an array of vapor injectors 208 that are connected to a vapor inlet 210 through a separate vapor manifold 212. The vapor injectors 208 may introduce vapor 214 into the liquid 202. The vapor manifold 212 may be thermally insulated from the outlet manifold 206 to prevent premature condensation. Acoustic transducers 216 may be configured to provide acoustic energy to the liquid 202, and noncondensable gases may be released from a noncondensables outlet 218. The countercurrent vapor condenser 200 may provide several advantages, including, but not limited to: providing uniform sub-cooling in the liquid throughout the tank because of a rise in saturation pressure with static head of the liquid; improved thermal mixing of the coolant due to the countercurrent velocity field; and efficient separation of the vapor from noncondensable gases. One exemplary embodiment may use a lower saturation temperature. One exemplary embodiment may use a higher saturation temperature and a more compact fluid reservoir 220, which may reduce the static pressure head of the liquid 202 on the vapor 214 in addition to leading to a more compact countercurrent condenser 200.

Figure 3:
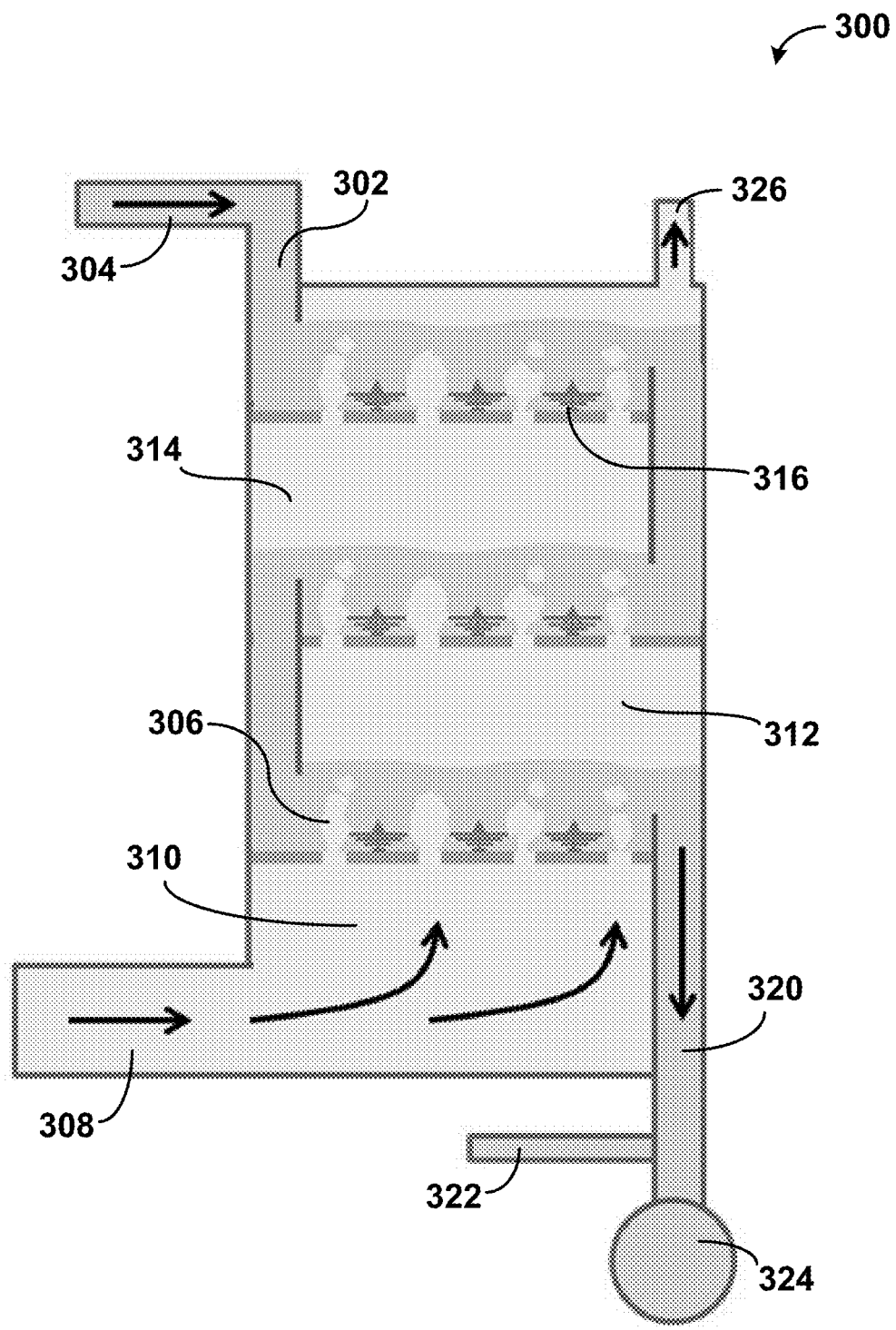
FIG. 3 depicts a multi-stage vapor condenser, in accordance with an exemplary embodiment of the present invention.

FIG. 3 depicts an exemplary embodiment of a multi-stage vapor condenser 300. In an exemplary embodiment, liquid 302 may enter the multi-stage vapor condenser 300 through the liquid inlet 304. Vapor 306 may enter the may enter the multi-stage vapor condenser 300 through the vapor inlet 308, which may be connected to a series of vapor manifolds. The series of vapor manifolds may include any number of vapor manifolds. For example, an embodiment may have a first vapor manifold 310, a second vapor manifold 312, and a third vapor manifold 314, such as the exemplary embodiment shown in FIG. 3. The first vapor manifold 310 may comprise an array of vapor injectors 316 that inject vapor 306 into the liquid 302. Acoustic transducers 318 may be configured to provide acoustic energy to the liquid 302. For example, an embodiment may position acoustic transducers 318 near any or all of the vapor injectors 316, such as the configuration shown in FIG. 3. An exemplary embodiment may position acoustic transducers 318 in any other array of positions and may not necessarily provide the same number of acoustic transducers 318 as vapor injectors 316. The liquid 302 may navigate the multi-stage vapor condenser 300 along a serpentine pathway, such as the exemplary embodiment illustrated in FIG. 3. An exemplary embodiment may navigate the multi-stage vapor condenser 300 along a differently oriented pathway, such as a stepped pathway. The liquid 302 may exit the multi-state vapor condenser 300 through the liquid outlet 304 and may subsequently be directed to a boiler through a boiler outlet 322. An exemplary embodiment may route some or all of the liquid 302 from the liquid outlet 320 to a pump 324 that may pump the liquid 302 to an air heat exchanger, for instance.

An exemplary embodiment may include a noncondensables outlet 326, which may be used to release noncondensable gases.

Figure 4A:
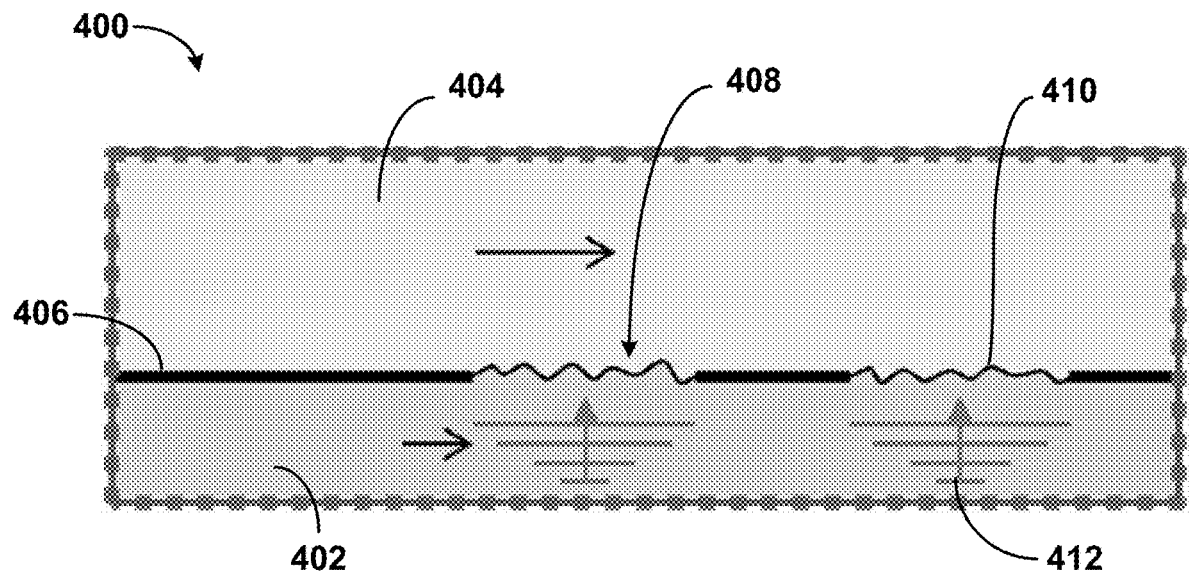
FIG. 4A depicts a co-flowing vapor condenser using a low-frequency transducer, in accordance with an exemplary embodiment of the present invention.
Figure 4B:
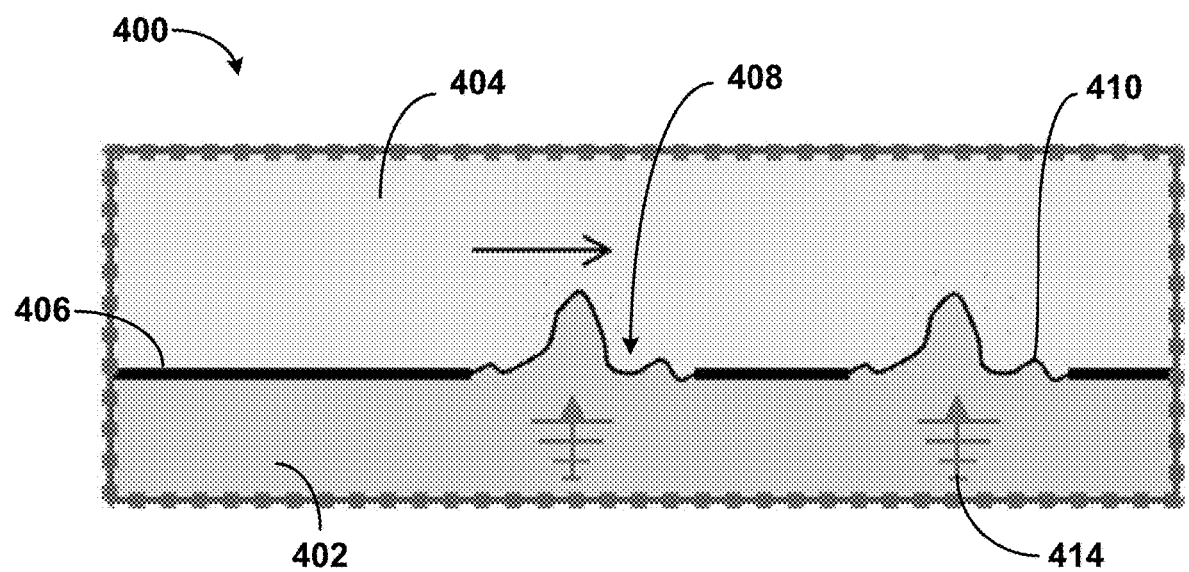
FIG. 4B depicts a co-flowing vapor condenser using a high-frequency transducer, in accordance with an exemplary embodiment of the present invention.

FIGS. 4A and 4B illustrate exemplary embodiments of a co-flowing vapor condenser 400, in which liquid 402 and vapor 404 may be separated by a liquid-vapor barrier 406. The liquid-vapor barrier 406 may comprise at least one aperture 408; an example embodiment may comprise a plurality of apertures 408. At an aperture 408, the liquid 402 and vapor 404 may meet to form a liquid-vapor interface 410. Acoustic transducers—such as low-frequency transducers 412 or high-frequency transducers 414—may provide acoustic energy to the liquid 402, and this acoustic energy may be configured to interact with the liquid-vapor interface 410. In an exemplary embodiment, the liquid 402 and vapor 404 may flow collinearly. The flows of the liquid 402 and vapor 404 may flow in the same direction or may flow in opposite directions. FIGS. 4A and 4B depict an exemplary embodiment in which the liquid 402 and vapor 404 may flow along a two-dimensional plane. An exemplary embodiment may comprise a co-flowing vapor condenser 400 in which the liquid 402 and vapor 404 may form a liquid-vapor interface 410 on, for example, the interior of air-cooled condensing tubes, such as those used in air-cooled A-frame condensers.

Figure 5:
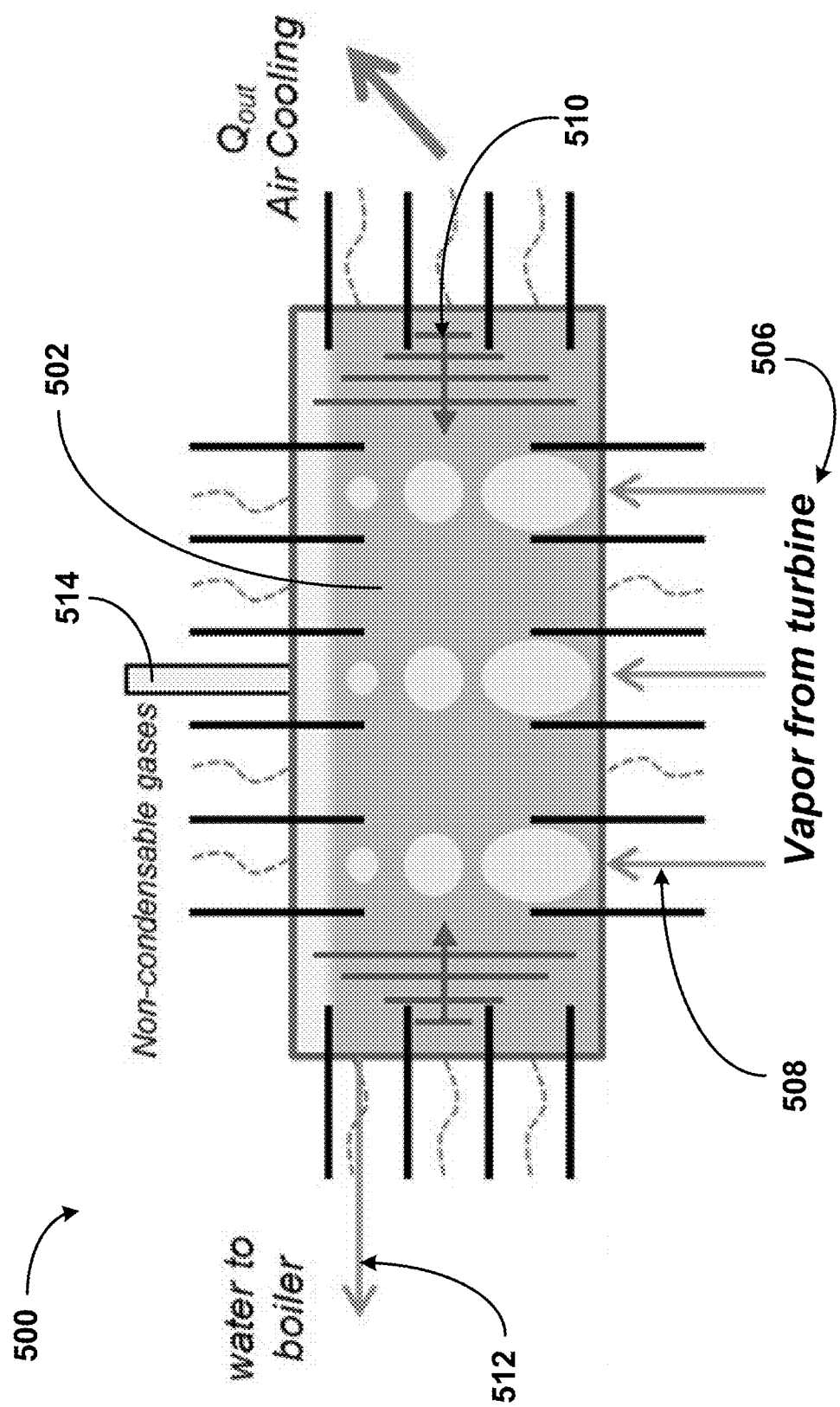
FIG. 5 depicts a direct-air-cooled vapor condenser, in accordance with an exemplary embodiment of the present invention.

An exemplary embodiment may include a direct-air-cooled vapor condenser 500 as shown in FIG. 5. Vapor 504 may be introduced to liquid 502 from a vapor source 506. The direct-air-cooled vapor condenser 500 may include a plurality of fins 508. An exemplary embodiment may include an acoustic transducer 510. Another exemplary embodiment may include a plurality of acoustic transducers 510. There may be a liquid outlet 512 leading, for example, to a boiler. An exemplary embodiment may include a noncondensables outlet 514 for releasing noncondensable gases.

Figure 6:
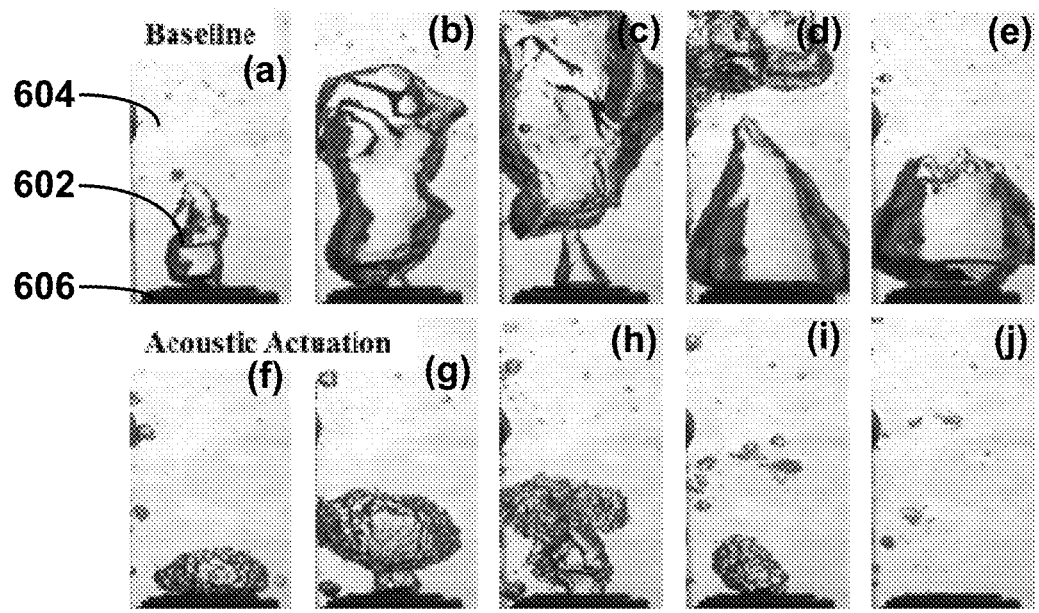
FIG. 6 depicts a panel of illustrations depicting a comparison of vapor bubbles in the absence of acoustic energy with vapor bubbles in the presence of low-frequency acoustic energy, in accordance with an exemplary embodiment of the present invention.

FIG. 6 provides a panel of illustrations depicting an exemplary embodiment in which vapor bubbles 602 are introduced into a liquid 604 from a nozzle 606. Panels a-e of FIG. 6 depict vapor bubbles 602 being released from a nozzle 606 in the absence of acoustic energy. Panels f-j of FIG. 6 depict vapor bubbles 602 being released from a nozzle 606 in the presence of acoustic energy being provided by a low-frequency acoustic transducer (not pictured) and having a frequency in the audible frequency range.

Figure 7:
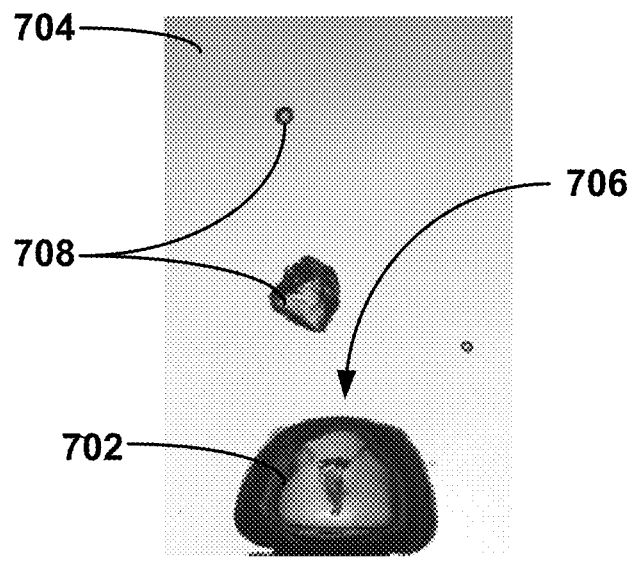
FIG. 7 depicts a vapor bubble in the presence of high-frequency acoustic energy, in accordance with an exemplary embodiment of the present invention.

FIG. 7 depicts an exemplary embodiment in which a vapor bubble 702 is introduced into a liquid 704, and a high-frequency acoustic transducer (not pictured) provides acoustic energy having a frequency in the ultrasonic frequency range to the liquid 704. The acoustic energy may form a spear-like protrusion 706. Radiation pressure generated by acoustic energy may lead to deformation of liquid/vapor interfaces. If the liquid/vapor interface is larger than the width of a beam of acoustic energy, the spear-like protrusion 706 may result. In certain embodiments, the acoustic energy provided by a high-frequency acoustic transducer may eject vapor droplets 708 from the vapor bubble 702. This may occur, for instance, by the formation of capillary waves, which can pinch off to become micron-scale vapor-droplets 708, or this may occur, for instance, as cavitation bubbles, which, after their formation and subsequent collapse, may eject relatively larger (for example, on the order of 100 µm), non-uniformly sized vapor droplets 708. As the spear-like protrusion 706 continues to protrude through the vapor bubble 702, it may reach the far side of the vapor bubble 702, changing the shape of the vapor bubble 702 from a spheroid to a torus, which may increase the surface area of the vapor bubble 702 and accelerate the collapse of the vapor bubble 702.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

We claim:

1. In a device for condensing vapor including:
   a liquid;
   a vapor; and
   a barrier;
   wherein at a location without the barrier, the device is configured so that the liquid and vapor are in contact creating a liquid-vapor interface;
   wherein at a location along the barrier, the liquid and vapor are not in contact inhibiting creation of the liquid-vapor interface; and
   wherein at the liquid-vapor interface, the device is configured so that the vapor condenses at a condensation rate;
   an improvement to the device for condensing vapor comprising:
   a disturbance device configured to increase disturbance of the liquid-vapor interface;
   wherein the increase of the disturbance of the liquid-vapor interface leads to an increase in the condensation rate of the vapor.

2. The device of claim 1, wherein the disturbance device is an acoustic transducer configured to create an acoustic beam directed towards at least a portion of the liquid-vapor interface causing the increase in disturbance of the liquid-vapor interface and the increase in the condensation rate of the vapor.

3. The device of claim 2, wherein the acoustic transducer is configured to provide acoustic energy at a frequency selected from the group consisting of ultrasonic and audible.

4. The device of claim 2, wherein the acoustic transducer is configured to operate in a range of about 0.5 MHz to about 10 MHz.

5. The device of claim 2, wherein the acoustic transducer is configured to operate in a range of about 400 Hz to about 20 kHz.

6. The device of claim 1, wherein the liquid is in a liquid flow;
   wherein the vapor is in a vapor flow; and
   wherein the liquid-vapor interface is created wherein the liquid flow and the vapor flow are in contact.

7. The device of claim 6, wherein the relative directions at which the liquid and the vapor flow is selected from the group consisting of collinearly, in opposite direction, and in the same direction.

8. The device of claim 7, wherein the barrier comprises two barrier portions located between the liquid flow and the vapor flow;
   wherein along the length of each barrier portion, the liquid flow and the vapor flow are not in contact, inhibiting creation of the liquid-vapor interface;
   wherein the barrier portions are separated from one another; and
   wherein the liquid-vapor interface is located between the barrier portions.

9. In a method of condensing vapor into liquid including:
   separating a sub-cooled liquid phase of a substance from a vapor along a length of a barrier, the vapor comprising a gas phase of the substance;
   forming a liquid-vapor interface between the liquid and the vapor at a location without the barrier; and
   condensing the vapor into the liquid at the liquid-vapor interface at a condensation rate;
   an improvement to the method for condensing vapor comprising:
   introducing acoustic energy to at least a portion of the liquid-vapor interface;
   wherein the acoustic energy deforms the liquid-vapor interface leading to an increase in the condensation rate of the vapor into the liquid.

10. The method of claim 9, wherein introducing acoustic energy comprises introducing acoustic energy having a frequency in the ultrasonic frequency range.

11. The method of claim 9, wherein introducing acoustic energy comprises introducing acoustic energy having a frequency in the audible frequency range.

12. The method of claim 9, wherein the improvement further comprises forming an additional liquid-vapor interface between the liquid and the vapor at an additional location without the barrier;
    wherein introducing acoustic energy to at least a portion of the liquid-vapor interface comprises:
    introducing a first acoustic beam directed at the liquid-vapor interface; and
    introducing a second acoustic beam directed at the additional liquid-vapor interface.

13. The method of claim 9, wherein the liquid flow is opposite in direction to the vapor flow.

14. The method of claim 9 further comprising, prior to separating the liquid from the vapor:
    flowing the liquid; and
    flowing the vapor;
    wherein separating comprises separating the liquid flow from the vapor flow along the length of the barrier;
    wherein forming comprises forming the liquid-vapor interface between the liquid flow and the vapor flow at the location without the barrier; and
    wherein the relative directions at which the liquid and the vapor flow is selected from the group consisting of collinearly, in opposite direction, and in the same direction.

15. The method of claim 9, wherein introducing acoustic energy comprises introducing an acoustic beam.

16. The method of claim 15, wherein the improvement further comprises forming vapor bubbles in the liquid;
  wherein the vapor bubbles travel generally in a first direction in the liquid; and
  wherein the acoustic beam transmits acoustic energy in a direction generally opposite the first direction.

17. The method of claim 15, wherein the improvement further comprises forming vapor bubbles in the liquid;
  wherein the vapor bubbles travel generally in a first direction in the liquid; and
  wherein the acoustic beam transmits acoustic energy in a direction generally perpendicular to the first direction.

18. A device for improving direct-contact vapor condensation using acoustic actuation comprising:
  a liquid flow of a sub-cooled liquid phase of a substance;
  a vapor flow of the substance in a vapor phase;
  a liquid-vapor barrier comprising at least one aperture; and
  an acoustic transducer associated with each aperture in the liquid-vapor barrier and having a non-actuation state when the acoustic transducer is off, and an actuation state when the acoustic transducer is on;
  wherein at a location along the liquid-vapor barrier, the liquid fluid and vapor fluid are not in contact inhibiting creation of the liquid-vapor interface;
  wherein when an acoustic transducer is in the non-actuation state:
    at the aperture of the liquid-vapor barrier associated with the acoustic transducer in the non-actuation state, the liquid flow and vapor flow are in contact creating a non-actuated liquid-vapor interface at which vapor condenses into the liquid at a non-actuated condensation rate;
  wherein when an acoustic transducer is in the actuation state:
    the acoustic transducer in the actuation state is configured to provide acoustic energy to at least a portion of the liquid-vapor interface in proximity to its associated aperture in the liquid-vapor barrier;
    at the associated aperture, the liquid-vapor interface is disturbed by the acoustic energy, and the liquid-vapor interface is an actuated liquid-vapor interface at which vapor condenses into the liquid at an actuated condensation rate; and
    the actuated condensation rate is greater than the non-actuated condensation rate.

19. The device of claim 18, wherein the vapor flow is opposite in direction to the liquid flow.

20. The device of claim 18, wherein the liquid-vapor barrier comprises at least two apertures.

21. The device of claim 20, wherein the relative directions at which the liquid and the vapor flow is selected from the group consisting of collinearly, in opposite direction, and in the same direction.

* * * * *